US009564624B2

(12) United States Patent
Kim et al.

(10) Patent No.: US 9,564,624 B2
(45) Date of Patent: Feb. 7, 2017

(54) MICROPOROUS COMPOSITE FILM WITH HIGH THERMOSTABLE ORGANIC/INORGANIC COATING LAYER

(75) Inventors: Yong Kyoung Kim, Daejeon (KR); Jang Weon Rhee, Daejeon (KR); Dong Jin Joo, Daejeon (KR); Je An Lee, Daejeon (KR); Jung Moon Sung, Seoul (KR)

(73) Assignee: SK Innovation Co., Ltd., Seoul (KR)

( * ) Notice: Subject to any disclaimer, the term of this patent is extended or adjusted under 35 U.S.C. 154(b) by 705 days.

(21) Appl. No.: 13/702,866

(22) PCT Filed: Jun. 10, 2011

(86) PCT No.: PCT/KR2011/004277
§ 371 (c)(1),
(2), (4) Date: May 9, 2013

(87) PCT Pub. No.: WO2012/169681
PCT Pub. Date: Dec. 13, 2012

(65) Prior Publication Data
US 2013/0224558 A1 Aug. 29, 2013

(30) Foreign Application Priority Data
Jun. 10, 2010 (KR) .................. 10-2010-0054786

(51) Int. Cl.
*H01M 2/16* (2006.01)
*C08L 23/02* (2006.01)
(Continued)

(52) U.S. Cl.
CPC ............. *H01M 2/1686* (2013.01); *C08J 7/04* (2013.01); *C08J 7/047* (2013.01); *C08L 23/02* (2013.01);
(Continued)

(58) Field of Classification Search
CPC .... H01M 2/164; H01M 2/166; H01M 2/1646; H01M 2/1686
(Continued)

(56) References Cited

U.S. PATENT DOCUMENTS 5,453,333 A * 9/1995 Takauchi ............ H01M 2/1653
429/142
7,807,287 B2 10/2010 Kono et al.
(Continued)

FOREIGN PATENT DOCUMENTS

| CN | 101002347 A | 7/2007 |
|---|---|---|
| CN | 101296795 A | 7/2012 |

(Continued)

*Primary Examiner* — James Lee
(74) *Attorney, Agent, or Firm* — The Webb Law Firm (57) ABSTRACT

Disclosed is a microporous composite film having a coating layer formed on at least one surface of a microporous polyolefin film, wherein the coating layer simultaneously includes a high thermostable polymer resin and inorganic particles. More specifically, the present invention relates to a microporous composite film in which an area shrinkage at 170° C. for 1 hr is 10% or less; a tensile modulus in each of a machine direction and a transverse direction at 130° C. is 0.5 MPa to 7.0 MPa; a ratio between permeability of a microporous composite film ($CCS_p$) and permeability of a microporous polyolefin film ($S_p$) is $1.1 \leq CCS_p/S_p \leq 3.5$; and a permeability of the microporous composite film is 450 sec or less.

5 Claims, 2 Drawing Sheets

(51) Int. Cl.
*C08J 7/04* (2006.01)
*H01M 10/052* (2010.01)

(52) U.S. Cl.
CPC .............. *H01M 2/166* (2013.01); *C08J 7/045* (2013.01); *C08J 2323/02* (2013.01); *C08J 2469/00* (2013.01); *C08J 2481/06* (2013.01); *H01M 10/052* (2013.01)

(58) Field of Classification Search
USPC .................................. 429/251–252, 144–145
See application file for complete search history.

(56) References Cited

U.S. PATENT DOCUMENTS

| | | | |
|---|---|---|---|
| 2002/0018938 A1* | 2/2002 | Takeuchi et al. | 429/317 |
| 2006/0046149 A1 | 3/2006 | Yong et al. | |
| 2006/0222936 A1* | 10/2006 | Yamaguchi et al. | 429/145 |
| 2007/0122716 A1* | 5/2007 | Seo et al. | 429/251 |
| 2009/0098450 A1 | 4/2009 | Kikuchi et al. | |
| 2010/0255362 A1* | 10/2010 | Ogawa et al. | 429/145 |
| 2010/0295511 A1 | 11/2010 | Kikuchi et al. | |

FOREIGN PATENT DOCUMENTS

| | | |
|---|---|---|
| JP | 200080197 A | 3/2000 |
| JP | 2005209570 A | 8/2005 |
| JP | 2007273443 A | 10/2007 |
| KR | 20020094819 A | 12/2002 |
| KR | 1020070080245 A | 8/2007 |
| KR | 1020080068722 A | 7/2008 |
| KR | 1020090074174 A | 7/2009 |
| KR | 1020100059933 A | 6/2010 |
| WO | 2009125984 A2 | 10/2009 |

\* cited by examiner

MICROPOROUS COMPOSITE FILM WITH HIGH THERMOSTABLE ORGANIC/INORGANIC COATING LAYER

TECHNICAL FIELD

The present invention relates to a microporous composite film capable of compensating for a lack of stability at high temperature in the existing microporous polyolefin film, and more particularly, to a microporous composite film having a coating layer formed by simultaneously including a high thermostable polymer resin and inorganic particles. In addition, the present invention relates to a microporous composite film suitable for a lithium secondary battery requiring high capacity/high power, such as a battery for a recent electric drive vehicle (EDV), or the like.

BACKGROUND ART

A microporous polyolefin film prepared through a stretching process has been widely used as a separator for various batteries, a filter for separation, and a membrane for microfiltration, due to its chemical stability and excellent physical properties. A separator for a secondary battery has high ionic conductivity through inner pores, together with a spatial separation function between a cathode and an anode.

A lithium secondary battery has high power/capacity density, but it employs an organic electrolyte. This organic electrolyte is decomposed due to overheating generated from abnormal behavior of the battery, and thus, the battery is ignited and exploded.

The microporous polyolefin film of the existing battery sufficiently performed a role of ensuring safety of the battery by a shutdown function, by which micropores are closed by thermal runaway generated from abnormal behavior of the battery. In recent, power/capacity density of the secondary battery are considerably increased due to high capacity/high power of the secondary battery, and thus the amount of heat generated at the time of abnormal behavior of the battery is increased largely. For this reason, the temperature of the battery instantly rises above the shutdown temperature of the microporous polyolefin film at the time of abnormal behavior of the battery, and thus, a separator is thermally melted and the film is shrunk. In this case, an electric short between electrodes occurs and an energy potential difference drops in an instant, and thus energy is intensively released from a portion where the electric short occurs. As a result, this causes an accident in which the battery is ignited, and further, exploded. Since this secondary battery with high capacity/high power is more widely applicable, the possibility of an accident injuring or damaging persons, buildings, properties and the like around the battery is more likely to occur. Therefore, the development of a separator having excellent thermostability at high temperature is being urgently required.

Japanese Patent Laid-Open Publication No. 2005-209570 discloses a multilayer type separator having an improved thermostability, which is manufactured by forming a coating layer on a polyolefin separator using a resin having high thermastabilty at 200° C. alone, in order to improve thermostability at high temperature. However, there is a disadvantage in that shrinkage of the separator generated at high temperature can not be sufficiently prevented because of using the high thermostable polymer resin alone. Further, since a resist layer capable of suppressing an electric short generated in the battery and improving a resistance force to foreign materials such as dendrites is not provided, there is a limit in manufacturing a battery having improved safety.

Although addition of inorganic matter is suggested in order to solve the instability problem caused by using only the thermostable resin, there is a problem in that the resin used is melted in an electrolyte liquid in most cases. Here, the high thermostable polymer resin, which supports the inorganic matter at high temperature, is melted to allow an inorganic layer to be separated, resulting in an unstable and irregular surface structure of the separator, and thus, power is reduced and stability is deteriorated.

Japanese Patent Laid-Open Publication No. 2007-273443 describes a method of coating on one surface of a base layer with a high thermostable polymer solution and then extracting a plasticizer, in order to compensate for a reduction in permeability due to formation of a coating layer. However, this method has disadvantages in that, although the high thermostable resin is used, the coating layer is easily separated from the base layer because adhesion between the coating layer and the base layer is hard due to the existence of the plasticizer on the surface of the base layer, uniformity among products is decreased because the coating layer is dissolved by the influence of a solvent used for extracting the plasticizer, and the stability is not excellent because a counter reaction may occur in the battery due to the remaining plasticizer. Furthermore, this method is not effectively because an extraction device becomes contaminated due to the complexity of the process and separation of the inorganic matter.

DISCLOSURE OF INVENTION

Technical Problem

An object of the present invention is to provide a separator suitable for a high-power/high-capacity lithium secondary battery, which has a maximum thermostability at high temperature as well as increased permeability, by simultaneously using a high thermostable polymer resin having excellent thermostability and a predetermined level of electrolyte impregnation property and inorganic particles having predetermined size and surface area to form a coating layer on at least one surface of the existing microporous polyolefin film.

More specifically, another object of the present invention is to provide a high-safety and high-power microporous composite film having an area shrinkage (170° C., 1 hr) of 10% or less, a tensile modulus in machine and transverse directions each at 130° C. of 0.5 MPa to 7.0 MPa, a ratio between permeability of a microporous composite film ($CCS_p$) and permeability of a microporous polyolefin film ($S_p$) of $1.1 \leq CCS_p/S_p \leq 3.5$, and permeability of the microporous composite film of 450 sec or less.

Solution to Problem

In order to achieve the above object, the present invention provides a microporous composite film, in which an organic/inorganic composite microporous coating layer having an excellent thermal characteristic by simultaneously including a high thermostable polymer resin having excellent thermostability and a predetermined level of electrolyte impregnation property and inorganic particles having predetermined size and surface area, is formed on at least one surface of a microporous polyolefin film having a shutdown function.

Hereinafter, the present invention will be described in more detail.

Unless technical terms used in the present description are defined otherwise, they have meanings understood by those skilled in the art to which the present invention pertains, and the description about known functions and components that may obscure the gist of the present invention will be omitted in the following description.

The present invention relates to microporous composite film having a coating layer with a thickness of 3 to 8 μm and a porosity of 25 to 60% formed on at least one surface of a microporous polyolefin film, the coating layer simultaneously including a high thermostable polymer resin having a melting temperature or glass transition temperature of 170° C. to 500° C. and inorganic particles having a porosity of 40 to 80%, wherein the microporous composite film has the following properties:

1) an area shrinkage (170° C., 1 hr) is 10% or less;
2) a tensile modulus in each of a machine direction and a transverse direction at 130° C. is 0.5 MPa to 7.0 MPa;
3) a ratio between permeability of the microporous composite film ($CCS_p$) and permeability of the microporous polyolefin film ($S_p$) is $1.1 \leq CCS_p/S_p \leq 3.5$; and
4) a permeability of the microporous composite film is 450 sec or less.

The microporous polyolefin film used as a base layer of the microporous composite film does not have a constitution particularly limited, and may employ one layer or more of microporous polyolefin film consisting of polyethylene and polypropylene.

This microporous polyolefin film is prepared by mixing a polyolefin-based resin with a diluent and then performing extruding, stretching, and extracting processes on the resulting mixture. If necessary, in order to embody a multilayer structure, appropriate die designing and extruders may be further provided in the processes. A mechanical strength required for the performance of a separator applied to a battery is obtained through the stretching process, and a porous structure is formed by removing the diluent from the stretched polyolefin film. The prepared microporous polyolefin film has a shutdown function in which pores are blocked due to shrinkage of the film, which occurs at high temperature. This function is a safety element against heat generated due to abnormal behavior of the battery, and is one of the great advantages of the microporous polyolefin film. Moreover, this function is one of the largest reasons that most current lithium-ion secondary batteries employ the microporous polyolefin film. The shutdown function is exhibited because micropores are blocked due to shrinkage of the stretched microporous film at 120 to 150° C. which is a temperature range around the melting temperature $T_m$ of the polyolefin-based resin, and it functions to shut off the flow of current due to the blocked micropores, thereby suppressing the battery from being further heated.

The microporous composite film embodied by the present invention has a shutdown function at 120° C. or higher, and more preferably, 120 to 150° C., and thus primarily prevents abnormal behavior of the battery which may be generated at high temperature.

However, in a case of a high-capacity/high-power battery, the temperature instantly rises above $T_m$ at the time of abnormal behavior of the battery due to high energy density, and thus, although the shutdown function is exhibited, the polyolefin-based resin crystals melt, which causes large shrinkage of the film, resulting in an electric short between electrodes.

The base layer used in the present invention is a basic part for preparing a microporous composite film retaining both high thermostability and high power characteristic. The microporous polyolefin film is characterized by a thickness of 8 to 30 μm, a puncture strength of 0.15 N/μm or more, a gas permeability (Gurley) of 40 to 250 sec, and an average pore diameter of a surface layer of 25 to 75 nm.

The puncture strength is obtained by measuring a strength at which the microporous polyolefin film is punched by dendrites and foreign materials, which may be generated due to charging/discharging of the battery. The puncture strength is preferably 0.15 N/μm or greater in order to ensure the safety of the battery. When the puncture strength is less than 0.15 N/μm, the microporous film is easily broken and punctured because of a weak resistance force against external pressure or distortion. In addition, the microporous polyolefin film preferably has a thickness of 8 to 30 μm. When the thickness of the microporous polyolefin film is less than 8 μm, a volume of a separator, which acts as a resistor, is decreased, resulting in a more increase in efficiency of the battery, but there is a limit in improving the safety of the battery due to a low mechanical strength even though a coating layer is formed. Whereas, when the thickness of the microporous polyolefin film is more than 30 μm, the battery has an increased resistance and the battery becomes thickened, and thus the power density of the battery is reduced. As the permeability becomes higher, the characteristics of the battery are improved. However, a high permeability means a high porosity and a large pore size, i.e., a decrease in stability. Therefore, the permeability is preferably 40 to 250 sec based on gas permeability (Gurley), which is a constant representing the permeability. In addition, the present invention employs a method of forming a coating layer on a surface of a microporous polyolefin film. Therefore, when the permeability of the microporous polyolefin film itself is more than 250 sec, it is difficult to realize sufficient permeability of the microporous polyolefin film, and as a result, the film is hard to be used in a high-power battery. When the permeability of the microporous polyolefin film itself is less than 40 sec, the microporous polyolefin film itself has a higher porosity, which causes a reduction in strength, and thus, the film can not be applied to the battery. Moreover, an average pore diameter of a surface layer of the microporous polyolefin film is a variable, which has a large correlation with the permeability of the microporous composite film, and it is preferably 25 to 75 nm. When the pore diameter is less than 25 nm, the permeability is basically low, and most pores are blocked because the high-thermostable polymer resin flows into the pores in a forming procedure of the coating layer, resulting in difficulty in realizing the permeabilty. When the pore diameter is more than 75 nm, the high-thermostable polymer resin flows into the pores and inhibits the shutdown function, and thus, sufficient shutdown does not occur at temperatures around $T_m$, of the polyolefin-based resin.

As for a general microporous polyolefin film, the microporous film is blocked at a high temperature of 120° C. or higher, thereby ensuring the primary safety of the battery. However, the microporous polyolefin film is largely shrunk at a high temperature of $T_m$ of the polyolefin-based resin or higher, and then the battery may become heated and exploded. Moreover, because a large electric short between electrodes may be generated, the safety can not be ensured in a case where a battery having high energy density and high power density employs the existing microporous polyolefin film.

Accordingly, in order to solve the above problems, the present invention used a method of forming a coating layer on at least one surface of the microporous polyolefin film by using a high thermostable polymer resin mixed with inorganic particles. Through this method, the microporous polyolefin film can be used in a high-power/high-capacity battery, by continuously performing a shutdown function for ensuring the primary safety of the battery, blocking the secondary shrinkage of the microporous polyolefin film generated at a temperature of $T_m$ or higher, and maximally maintaining the permeability of a base layer itself.

The high thermostable polymer resin supporting the coating layer may employ a resin having excellent thermostability, which has a melting temperature or a glass transition temperature of 170 to 500° C., and a heat distortion temperature of 170° C. or higher. Suitable examples of the high thermostable polymer resin include polyphenylsulfone, polyarylate, polyethersulfone, polyamideimide, polybenzimidazole, and the like. This high thermostable polymer resin, when coated on the base layer in a predetermined thickness, dose not shrink until the temperature reaches the melting temperature or the glass transition temperature of the resin, thereby exhibiting excellent thermostability. However, when the resin is used alone, the pores of the microporous polyolefin film become blocked, and thus, permeability can not be sufficiently realized. For this reason, permeability can be realized through a phase separation using a nonsolvent or impregnation with the nonsolvent, but, when a range of permeability to which the present invention is to realize is embodied, a loose network structure is formed in the resin; for example, empty spaces are generated in the resin. For this reason, a sufficient resistance force for blocking the shrinkage of the base layer in the machine direction and the transverse direction at high temperature is lost, and thus, the safety at high temperature is not sufficient; for example, area shrinkage occurs by several tens of percent or more at a temperature of 150° C. or higher. When the glass transition temperature, the melting temperature, and the heat distortion temperature of the resin are lower than 170° C., this resin has little resistance force against distortion which may be generated at a high temperature of 170° C. or higher, i.e., shrinkage, and thus, it is not suitable in the safety at high temperature, which is to be realized by the present invention. When the melting temperature or the glass transition temperature of the resin is higher than 500° C., this resin has an excellent chemical resistance, resulting in a low affinity with most organic solvent, and thus, it is hard to use.

In order to solve the above problems and develop a microcopous composite film having both high permeability and thermostability at high temperature, the present invention employed inorganic particles together with the high thermostable polymer resin. Preferable examples of the inorganic particles include one or more selected from $Al_2O_3$, $SiO_2$, $BaTiO_3$, $Al(OH)_3$, and $TiO_2$. The inorganic particles preferably have an average particle diameter of 0.3 to 1.5 μm and a surface area of 3 to 10 m²/g, and a porosity of the inorganic particles is preferably 40 to 80%.

Since the coating layer generally acts as a second resistance layer additively provided on the microporous polyolefin film, which is the base layer, it inevitably reduces the permeability. To solve these problems, the present invention provides a method capable of maximally suppressing the reduction in permeability by selecting appropriate inorganic particles and adjusting the ratio between the inorganic particles and the high thermostable polymer.

The porosity of particles is preferably 40 to 80% in order to realize high permeability. The following formula 1 is for calculating the porosity of the particles.

$$\text{POROSITY OF INORGANIC PARTICLES} = 100 - \left(\frac{\text{TAP DENSITY}}{\text{ABSOLUTE DENSITY}}\right) \times 100 \quad \text{[Formula 1]}$$

In a case where the porosity of the particles is less than 40%, most pores of the inorganic particle are blocked due to binding with the high thermostable polymer resin, and thus, the permeability is largely decreased. Therefore, it is difficult to realize a separator for the high-power/high-capacity battery that the present invention is to realize. On the other hand, in a case where the porosity of the particles is more than 80%, the porosity of the particles is too large, and thus, the absolute number of particles per unit area is insufficient. Therefore, thermostability is significantly decreased and the amount of the high thermostable polymer resin, which needs to adhere to the inorganic particles, is excessive, to block the surface of the microporous polyolefin film, and as a result, the permeability is decreased. The inorganic particles may be surface-treated with an inorganic surface modifier such as a silane-based additive or an acid-based additive, in order to increase the adhesion with the high thermostable polymer resin, and improve the dispersion stability in a liquid. Since these inorganic particles are not distorted or broken by foreign materials and external impact and do not have thermal distortion even at a high temperature of 200° C. or higher, they bind with the high thermostable polymer resin to prevent the base layer from shrinking at high temperature and punched by foreign materials such as lithium dendrites. In addition, an appropriate ratio between the inorganic particles and the high thermostable polymer resin allows various permeabilities. The reason is that most of the high thermostable polymer resin is adsorbed on surfaces of the inorganic particles, and thus a porosity of a coating layer becomes a difference obtained by deducting a volume percent of the high thermostable polymer resin from the porosity of the inorganic particles. Since this value is proportional to the permeability of the entire microporous composite film, appropriate combination between the high thermostable polymer resin and the inorganic particles allows the preparation of the microporous composite film in which high permeability is maintained and thermostability at high temperature is ensured.

When the inorganic particle for forming the coating layer has a diameter of less than 0.3 μm, the particles are difficult to disperse in liquid, which causes to reduce the productivity, and the permeability of the final microporous composite film is difficult to realize due to a low porosity of particles. In addition, when the inorganic particle has a diameter of more than 1.5 μm, the particles are easy to be dispersed, but the surface area of the particles becomes decreased. Therefore, a binding strength between the high thermostable polymer resin and the particles or between particles is largely reduced, resulting in an irregular surface and an irregular thickness distribution. The inorganic particles need to be within the above size range, and need to have a surface area of 3 to 10 m²/g. When the inorganic particles have a surface area of less than 3 m²/g, a binding strength between the resin and the particles is decreased due to a lower surface area of the inorganic particles, and thus the formed coating layer is easily come off. Moreover, surplus high thermostable polymer resin exists at an interface between the coating layer and the microporous film in a large amount, thereby reducing the permeability. Whereas, when the surface area of the inorganic particles is more than 10 m²/g, an adhesive strength between coating layer and the microporous film, which is a base layer, is remarkably decreased due to a high surface area of the inorganic particles. Therefore, the inorganic particles are used in a smaller amount compared with a case of inorganic particles having a low surface area, in order to maintain the adhesive strength. In this case, the amount of inorganic particles used is insufficient, and thus, the film shrinks at high temperature.

The following formula 2 is for calculating a porosity of the coating layer itself, and the coating layer according to the present invention has a porosity of 25 to 60%. However, when a dense coating layer having a porosity of less than 25% is formed, the permeabilty of the coating layer is lowered, and thus, the amount of electrolyte held in the battery is decreased, thereby reducing power density and cycle characteristics of the battery. Furthermore, since this coating layer has an increased weight per unit area, compared with a coating layer having the same thickness and a higher porosity, an energy density (W/kg) of the battery is decreased, and thus, efficiency of the battery is largely decreased. Meanwhile, when the coating layer is formed to have a porosity of more than 60% in order to minimize the reduction in permeability, the coating layer has a very loose structure. Therefore, a contact area between the base layer and the coating layer, which is a heat-resistant layer, is decreased, and thus, the coating layer is easily come off. In addition, the inorganic particles and the high thermostable polymer resin for maintaining a shape of the base layer at high temperature become insufficient, and thus, thermostability of the battery is largely reduced. The porosity of the coating layer is adjusted through mass ratios of the high thermostable polymer resin and the inorganic particles, and a tap density and an absolute density of the inorganic particle, which are respective terms in the above equation (2). In particular, the densities of the inorganic particle, especially, the tap density, which exhibits the porosity of the inorganic particles, is an inherent characteristic of the inorganic particle, and has various values according to the size distribution and shape of the particles. Since the porosity and permeability of the entire composite film can be determined by the tap density, the kinds of inorganic particles can be variously selected according to the ranges of the porosity and permeability to be realized within the above range. In the microporous composite film, the high thermostable polymer resin and the inorganic particles for forming the coating layer need to be mixed in an appropriate ratio, in order to simultaneously exhibit high permeability and high thermostability to be embodied by the present invention. As for the ratio, a content of solid including the high thermostable polymer resin, and the inorganic particles is 10 to 30 parts by weight, based on 100 parts by weight of solvent. The mass ratio between the high thermostable polymer resin and the inorganic particles, satisfying the formula 2, is preferably 30/70 to 5/95, but not limited thereto.

$$25\% \leq 100 - \left( \frac{\frac{\text{MASS RATIO OF INORGANIC PARTICLES}}{\text{ABSOLUTE DENSITY OF INORGANIC PARTICLES}}}{\frac{\text{MASS RATIO OF INORGANIC PARTICLES}}{\text{ABSOLUTE DENSITY OF INORGANIC PARTICLES}} + \frac{\text{MASS RATIO OF RESIN}}{\text{ABSOLUTE DENSITY OF RESIN}}} \times \frac{\text{TAP DENSITY OF INORGANIC PARTICLES}}{\text{ABSOLUTE DENSITY OF INORGANIC PARTICLES}} \times 100 \right)$$

[Formula 2]

$$\left( \frac{\frac{\text{MASS RATIO OF RESIN}}{\text{ABSOLUTE DENSITY OF RESIN}}}{\frac{\text{MASS RATIO OF INORGANIC PARTICLES}}{\text{ABSOLUTE DENSITY OF INORGANIC PARTICLES}} + \frac{\text{MASS RATIO OF RESIN}}{\text{ABSOLUTE DENSITY OF RESIN}}} \times 100 \right) \leq 60\%$$

The coating layer consists of the high thermostable polymer resin and the inorganic particles, and a combination thereof allows the manufacturing of various products capable of simultaneously ensuring both thermostability at high temperature and high permeability and preventing the coating layer from being come off and broken due to excellent surface stability. When the mass ratio between the high thermostable polymer resin and the inorganic particles is less than 30/70, a porosity of the coating layer is decreased because the amount of high thermostable polymer resin is more, as compared with that of the inorganic particles, and thus, the permeability of the entire microporous composite film is reduced. Although the content of the high thermostable polymer resin is high, shrinkage of the film at high temperature can not be sufficiently prevented. The reason is that a force capable of preventing the shrinkage is lost because a network structure for securing the permeability becomes loose, a shrinking force of the base layer itself is increased, and a distance between the inorganic particles is lengthened, even though the content of the high thermostable polymer resin is high in order to prevent the base layer from being shrunk at the melting temperature of the polymer resin or higher. Meanwhile, when the mass ratio between the high thermostable polymer resin and the inorganic particles is more than 5/95, a microcopous composite film having high permeability can be prepared. However, the amount of high thermostable polymer resin performing a role of connecting between the inorganic particles and the base layer is decreased, and thus, an adhesive strength is remarkably reduced; for example, the base layer and the coating layer are separated from each other and the inorganic powder comes off from a surface of the film. As a result, shrinkage of the base layer at high temperature can not be prevented and the base layer is easily come off. In addition, this causes inorganic matters to be blown off during assembling of the battery, resulting in secondary contamination.

On the other hand, considering the ratio between the above-cited high thermostable polymer resin and the inorganic particles, the inorganic particles having a relatively high density make up most of the solid content (the ratio of a sum of the high thermostable polymer resin and the inorganic particles in the solvent in which the high thermostable polymer resin is dissolved). Therefore, the content of the solid including the high thermostable polymer resin and the inorganic particles is preferably 10 to 30 parts by weight, based on 100 parts by weight of solvent. When the solid content is less than 10 parts by weight, the cited solid content is advantageous in dispersing in the solution and formation of the coating layer, but the coating layer is difficult to be formed to have a target thickness due to low viscosity. Furthermore, the absolute amount of inorganic particles and the high thermostable polymer resin for maintaining the shape of the base layer is insufficient, and thus the structure of the coating layer is not stable and the coating layer is easily come off from the base layer, resulting in deterioration in workability. When the solid content is more than 30 parts by weight, the solid content, especially, the amount of inorganic particles considering the above-cited ratio between the inorganic particles and the high thermostable polymer resin, is increased in the solution, and thus, dispersion in the solution is not excellent, the inorganic particles are precipitated, and the viscosity of the solution is increased. These problems may increase the possibility that an irregular coating layer is formed during a process of forming the coating layer, and thus, various defects may be generated in the final coating layer prepared through a drying process.

In addition, the coating layer formed on at least one surface of the microporous polyolefin film preferably has a thickness of 3 to 8 μm. When the thickness of the coating layer is less than 3 μm, an adhesive strength of the coating layer is decreased. Whereas, when the thickness of the coating layer is more than 8 μm, a resistance in the battery due to the coating layer is increased so much, and thus, a size of the battery is increased and a weight per unit area of the battery is increased in view of permeability and efficiency of the battery, resulting in a reduction in energy density of the battery. In addition, the thickened inorganic layer is easily broken and come off by any movement thereof such as folding, resulting in contamination due to foreign materials which are broken or come off from the coating layer at the time of winding products or during assembling the battery.

In the microporous composite film prepared according to all the cited conditions, the coating layer has a weight of 4.0 to 14.0 g/m². The weight of the coating layer may be calculated by a weight difference between the microporous composite film before forming the coating layer and the microporous composite film after forming the coating layer. When the coating layer having the cited 3 to 8 μm thickness has a weight of less than 4.0 g/m², it means that the content of the high thermostable polymer resin, which has a low density, is high, and thus, this may lead to shrinkage at high temperature. Whereas, when the coating layer having the cited 3 to 8 μm thickness has a weight of more than 14.0 g/m², it means that the inorganic particles are insignificantly dense when the coating layer is formed, and thus, this deteriorates characteristics of the battery due to low porosity, resistance layers, and large weight.

In the present invention, the microporous composite film, in which the inorganic particles are used at the time of forming the coating layer, has a largely increased affinity with the electrolyte, and thus, mitigates the reduction in permeability due to formation of the coating layer.

Several nanometers of pores of the microporous polyolefin film has an excellent affinity to a solution, which is to be coated for forming the coating layer. The reason is that a solubility parameter of a polyolefin-based resin consititutting the microporous film is similar to that of an organic solvent used, resulting in easy impregnation and a capillary phenomenon due to small micropores. For this reason, the high thermostable polymer resin used for forming the coating layer is absorbed in the pores of the microporous film together with the solvent, and then adsorbed in the pores through a drying process. Due to this procedure, the pores of the microporous film have a decreased size, resulting in a reduction in the overall permeability. In the present invention, a ratio between an average pore diameter of the microporous composite film ($CCS_{ps}$) and an average pore diameter of the microporous polyolefin film ($S_{ps}$) is preferably $1.01 \leq S_{ps}/CCS_{ps} \leq 1.5$. When a value of $S_{ps}/CCS_{ps}$ is more than 1.5, the high thermostable polymer resin is coated on insides of the pores to prevent the occurrence of a shutdown phenomenon in which the pores of the microporous film are blocked at temperatures around 120 to 150° C. Furthermore, electrolyte impregnation is decreased as the pores are blocked, and thus, performance of the battery is deteriorated. When a value of $S_{ps}/CCS_{ps}$ is less than 1.01, the high thermostable polymer resin less inserts in the pores of the microporous polyolefin film, and thus, an adhesion between the coating layer and the microporous polyolefin film can not be maintained. As a result, the coating layer becomes come off. In order to measure the $CCS_{ps}$ value, the coating layer is sufficiently removed by using a tape, and then measurement is performed by a pore diameter measuring device.

As such, the high thermostable polyolefin resin performs a role of supporting the coating layer, and also performs a role of reducing the permeability by blocking the insides of the pores. In order to compensate for reduction in permeability due to the blocked pores, the present invention employed a high thermostable polymer resin having an electrolyte impregnation rate at 80° C. of 1 to 20%. When the electrolyte impregnation rate is less than 1%, the resin blocking the pores causes an area through which ions pass to be decreased, thereby dropping the power of the battery. When the electrolyte impregnation rate is more than 20%, the resin is swollen, which weakens an adhesive strength with the inorganic particles formed in the coating layer, and thus, the inorganic particles are separated from the high thermostable polyolefin resin.

In the prepared microporous composite film, an adhesive strength between the coating layer and the microporous polyolefin film is significantly important. References by grades for determining an adhesive strength are shown in Table 1.

TABLE 1

| Grades | Adhesive strength |
|---|---|
| Grade A | Inorganic matter is not smeared on the drawing paper. |
| Grade B | A small amount of inorganic matter is smeared on the drawing paper, and 10% or less of the coated surface comes off. |
| Grade C | 30% or less of the coated surface comes off. |
| Grade D | 50% or less of the coated surface comes off. |
| Grade F | 80% or more of the coated surface comes off. |

As shown in Table 1, when the adhesive strength is lower than grade B, the inorganic matter is heavily blown out during a slitting process, resulting in a drop in the yield. Furthermore, the inorganic matter is adsorbed on a surface of the microporous film, resulting in a secondary defect such as a protrusion. In addition, the inorganic matter separated from a production line during a battery assembling procedure causes a drop in productivity, and in an extreme case, may causes changes and nonuniformity in performance of the battery because the coating layer comes off. Therefore, the coating layer preferably has an adhesive strength of grade B or higher in the adhesive strength grade defined by the present invention.

The microporous composite film at which the present invention aims has three characteristics to be described as follows.

A first characteristic of the microporous composite film is to prevent the base layer from shrinking. The high thermostable polymer resin and the inorganic particles constituting the coating layer are coated on the base layer in a dense structure. The high thermostable polymer resin is not thermally distorted even at a temperature at which the base layer is shrunk, and thereby, it has an excellent thermostability. A shrinkage force generated when the base layer is shrunk is prevented by expressing both an excellent binding strength between the high thermostable polymer resin and the inorganic particles and a resistance force of the densely provided inorganic particles, which is generated while the base layer is shrunk.

A second characteristic of the microporous composite film is a resistance force against stretching due to external stimulus. The resistance force is improved at high temperature by the high thermostable polymer resin coated on the base layer, when the external stimulus, such as external force or external deformation, is generated. The improved resistance force at high temperature can be explained by using a concept of a high-temperature tensile modulus, and is specified as follows.

A third characteristic of the microporous composite film is the permeability related to the power of the battery. By improving the safety at high temperature and maintaining the permeability at a high level, a separator suitable for a high-power/high-capacity lithium secondary battery at which the present invention aims can be provided.

Since the microporous polyolefin film used in the present invention is prepared through a stretching process, it is shrunk at high temperature, and especially, it is largely shrunk at temperatures of the melting temperature ($T_m$) or higher. Therefore, an area shrinkage rate is at least 50% at 170° C., which is no lower than the melting temperature of the microporous polyolefin film used as the base layer. On the other hand, when the high thermostable polymer resin and the inorganic particles are simultaneously used for the coating layer, products having high permeability and thermostability at high temperature can be manufactured.

As for the microporous composite film according to the present invention, an area shrinkage rate at 170° C. for 1 hour thereof does not exceed 10%. The shrinkage is prevented by a complex synergy effect of the high thermostable polymer resin and the inorganic particles and an increase in tensile modulus to be described below. The composite microcoporous film, of which shrinkage is blocked in a machine direction and a transverse direction, is shrunk in a thickness direction, and thus, the entire thickness of the film is decreased at a rate similar to the porosity of the base layer itself. This phenomenon occurs because the pores of the base layer are blocked. When the area shrinkage rate is more than 10%, the battery may be ignited and exploded because of a widened area of electric shorts.

The tensile modulus, which partly contributes to the above-cited prevention of the shrinkage and allows measurement of the resistance force against external stimulus, may be generally represented by stress/strain. In other ways, the tensile modulus can be measured as a degree at which a material is distorted when stress is applied to the material. A standard for measuring the stability of materials at high temperature against external stimulus can be established by measuring a degree at which a material is distorted when the stress applied to the material is increased at high temperature. In a case of the battery, an internal electric short occurs by foreign materials, for example, protrusions, such as dendrites generated as a kind of lithium reactant at the time of charging and recharging. When the internal electric short occurs, an instant energy is concentrated on a portion where the electric short occurs, thereby generating heat, and thus, an area of electric short is gradually widened based on the portion where the electric short occurs, due to shrinkage of the separator. In a case of the microcopous composite film having the coating layer formed therein, breakage of the microcopous composite film due to foreign materials such as dendrites is minimized. Moreover, even though the electric short occurs, the tensile modulus is improved due to use of the inorganic particles and the high thermostable polymer resin. As a result, when stress by the foreign materials is generated, the resistance force is improved and the distortion is not generated, resulting in high stability. In addition, the battery may be swollen by an oxidation reaction of electrolytic liquid at high temperature, or the like. In this case, when the battery is swollen, the separator is stretched in a machine direction, and relatively shrunk in a transverse direction, which causes danger due to electric short. Whereas, the tensile modulus of the microcopous composite film is improved when the coating layer is formed in the composite film. Although the above problems are generated, the microporous composite film has a resistance force against the stress, and thus it is not distorted, resulting in preventing danger that may be generated.

A general microporous polyolefin film has a tensile modulus of less than 0.5 MPa in a machine direction and a transverse direction each at 130° C., while the microporous composite film having the coating layer according to the present invention has a tensile modulus of 0.5 to 7.0 MPa. When the tensile modulus used is less than 0.5 MPa, the film is easily distorted by even a slight force at temperatures around the melting temperature ($T_m$) of the polyolefin-based resin, and there is a lack of a force for shutting off the distortion against the external stimulus. Most of the general microporous polyolefin films have a tensile modulus of 0.2 MPa or less, but the tensile modulus may be increased to 0.5 MPa, depending on the molecular weight of the polyolefin-based resin used at the time of preparing the microporous polyolefin film and a process method. However, when the tensile modulus is more than 7.0 MPa, the resistance force against the distortion is too large due to a high tensile modulus, and thus, a shutdown function of the microporous polyolefin film, which is generated at temperatures of less than Tm, is not exhibited.

In addition, a ratio between a permeability the microporous composite film ($CCS_p$) and a permeability of the microporous polyolefin film ($S_p$) (based on Gurley) of the present invention needs to be $1.1 \leq CCS_p/S_p \leq 3.5$. The above range may be adjusted depending on the kind of inorganic particles, a ratio between appropriate inorganic matter and high thermostable polymer, or the like. When a value of $CCS_p/S_p$ is less than 1.1, an increase in resistance due to the solution coated on the microporous polyolefin film is small, but an adhesive strength between the coating layer and the base layer is decreased. Whereas, when a value of $CCS_p/S_p$ is more than 3.5, efficiency of the battery is decreased due to low porosity of the coating layer, and a structure in which small pores are formed or pores are difficult to be formed. For this reason, power of the battery is decreased, and thus, this film is not suitable for the battery having a purpose of high power. In addition, when the permeability of the microporous composite film is more than 450 sec, capacity and power of the battery are decreased, and thus, efficiency of the battery is reduced.

In order to achieve the above objects, a method for preparing a microporous composite film of the present invention includes:

1) preparing a microporous polyolefin film;
2) mixing a high thermostable polymer resin and inorganic particles to prepare a solution;
3) coating the solution on at least one surface of the microporous polyolefin film to form a coating layer; and
4) sufficiently drying and removing a solvent from the formed coating layer.

This will be described in detail as follows.

According to the method, a sheet type of molded material is formed from a mixture of 20 to 50 wt % of a polyolefin-based resin having an weight-average molecular weight of $2.0 \times 10^5$ to $6.5 \times 10^5$ and 80 to 50 wt % of a diluent by using a die, and a general casting or calendaring method may be used alone or in combination.

The microporous polyolefin film may further include additives such as a UV stabilizer, an antistatic agent, an oxidation stabilizer, and the like, as necessary.

Any organic liquid compound that forms a single phase together with a resin at an extrusion temperature may be used as the diluent used in the present invention. Examples of the diluent may include aliphatic or cyclic hydrocarbons such as nonane, decane, decaline, paraffin oil, etc.; phthalic acid esters, such as dibutyl phthalate, dihexyl phthalate, dioctyl phthalate, etc.; aromatic ethers, such as diphenyl ether, benzyl ether, etc.; fatty acids having 10 to 20 carbons, such as palmitic acid, stearic acid, oleic acid, linoleic acid, linolenic acid, etc.; fatty alcohols having 10 to 20 carbons, such as palmitic alcohol, stearic alcohol, oleic alcohol, etc.; and fatty esters in which one or more fatty acids among saturated and unsaturated fatty acids having 4 to 26 carbons of a fatty acid group consisting of palmitic mono-, di-, or tri-ester, stearic mono-, di-, or tri-ester, oleic mono-, di-, or tri-ester, linoleic mono-, di-, or tri-ester, or the like, are bound with alcohols having 1 to 8 hydroxyl groups and 1 to 10 carbons by an ester linkage. If a phase separation condition is satisfied, one or more of the above materials may be mixed and used.

A single phase of melted material passed through the melting/compounding/extruding procedures is cooled to room temperature, to manufacture a sheet having predetermined thickness and width (a step of phase-separating polyolefin and diluent). The sheet manufactured through the phase separating procedure is stretched at a total stretching ratio of 25-70 times as well as a machine direction stretching ratio of 5.0 times or more and a transverse direction stretching ratio of 5.0 times, in order to secure the physical properties of the above-specified microporous polyolefin film. The diluent is extracted from the stretched film by using an organic solvent, and the resulting film is dried. The dried film may be subjected to a heat-setting process in order to finally remove the residual stress and decrease the shrinkage ratio, as necessary. The heat-setting process removes the residual stress by setting the film, applying heat to the set film, and compulsorily holding the film. Here, the time for heat-setting needs to be relatively shortened when the heat-setting temperature is high, and may be relatively lengthened when the heat-setting temperature is low. The time for heat-setting is preferably about 15 seconds to 2 minutes. Through the heat-setting procedure, the residual stress of the microporous polyolefin film can be minimized and quality uniformity of the microporous composite film can be improved.

The high thermostable polymer resin used in the step (2) may include a mixture of one or more selected from polyphenylsulfone, polyarylate, polyethersulfone, and polyamideimide, polybenzimidazole.

In order to prepare the solution in step (2), a method of dissolving the high thermostable polymer resin in the solvent first, and then adding the inorganic particles thereinto may be used, and also, a method of dissolving the high thermostable polymer resin and the inorganic particles simultaneously may be used. The organic solvent used in the present invention may include any that can dissolve the high thermostable polymer resin under any conditions and disperse the inorganic particles. Specific examples of the organic solvent may include a mixture of one or more selected from tetrachloroethane, methylene chloride, chloroform, 1,1,2-trichloroehtane, tetrahydrofuran, 1,4-dioxane, chlorobenzene, cyclohexanone, dimethylformamide, acetone, dimethylacetamide, dimethylsulfoxide, N-methyl-2-pyrrolidone, and the like.

In order to form the coating layer in step (3), the high thermostable polymer resin and the inorganic particles dissolved and dispersed in the organic solvent are coated on at least one surface of the microporous polyolefin film. The inorganic particle may be first modified by allowing the inorganic particle to include a silane-based additive or an acid-based additive for improving an adhesive strength with the high thermostable polymer resin, and may be selectively used together with the high thermostable polymer resin solution.

The method of coating the solution on the microporous polyolefin film in step (3) may include a bar coating method, a rod coating method, a die coating method, a wire coating method, a comma coating method, a micro gravure/gravure coating method, a dip coating method, a spray coating method, a spin coating method, or a mixed method thereof or a modified method thereof. The coating layer coated on the base layer in a solution state is subjected to step (4), in which the solvent is removed through the drying procedure under predetermined temperature and humidity. Here, the drying method is particularly not limited, and may include air blowing, using IR heater, UV curing, or the like.

Moreover, the microporous composite film according to the present invention can be advantageously used for a separator of a battery such as a lithium-ion battery, a fuel cell, or the like.

Advantageous Effects of Invention

As set forth above, a microporous composite film according to the present invention can minimize a reduction in permeability of the microporous polyolefin film, and fundamentally solve the safety problem due to high power/high capacity of a battery, through high thermostability at high temperature. In addition, the microporous composite film according to the present invention has a uniform thickness and an excellent quality, thereby allowing a stable and reliable battery to be manufactured.

BRIEF DESCRIPTION OF DRAWINGS

The above and other objects, features and advantages of the present invention will become apparent from the following description of preferred embodiments given in conjunction with the accompanying drawings, in which.

BEST MODE FOR CARRYING OUT THE INVENTION

Hereinafter, the present invention will be described in more detail through the following examples, but the following examples have a purpose of illustrating the present invention and do not intend to limit the scope of the present invention.

EXAMPLES

Several characteristics of a microporous polyethylene composite film of the present invention were evaluated by the following test methods.

(1) Thickness

A contact type thickness measuring device having a thickness precision of 0.1 μm was used.

(2) Thickness of Coating Layer

When a coating layer is formed on a surface of a microporous film, a thickness of coating layer was calculated from a difference between a thickness of the microporous film before coating and a thickness of the microporous film after coating. In case where both surfaces of the microporous film were coated, a half of the difference between the thickness of the microporous film before coating and the thickness of the microporous film after coating was used as the thickness of the coating layer.

(3) Porosity (%) of Coating Layer (a) A mass ratio between a high thermostable polymer resin and inorganic particles and a density of the inorganic particle were measured, and then porosity was calculated by the following Equation 1 using the measured values.

$$100 - \left( \frac{\frac{\text{MASS RATIO OF INORGANIC PARTICLES}}{\text{ABSOLUTE DENSITY OF INORGANIC PARTICLES}}}{\frac{\text{MASS RATIO OF INORGANIC PARTICLES}}{\text{ABSOLUTE DENSITY OF INORGANIC PARTICLES}} + \frac{\text{MASS RATIO OF RESIN}}{\text{ABSOLUTE DENSITY OF RESIN}}} - \frac{\text{TAP DENSITY OF INORGANIC PARTICLES}}{\text{ABSOLUTE DENSITY OF INORGANIC PARTICLES}} \times 100 \right) \quad \text{[Equation 1]}$$

$$\left( \frac{\frac{\text{MASS RATIO OF RESIN}}{\text{ABSOLUTE DENSITY OF RESIN}}}{\frac{\text{MASS RATIO OF INORGANIC PARTICLES}}{\text{ABSOLUTE DENSITY OF INORGANIC PARTICLES}} + \frac{\text{MASS RATIO OF RESIN}}{\text{ABSOLUTE DENSITY OF RESIN}}} \times 100 \right)$$

(4) Particle Size

A particle size was measured from an apparent pore size measured from an electron micrograph with respect to a surface of the film.

(5) Average Pore Diameter

An average pore size was measured using a Porometer (CFP-1500-AEL from PMI Inc.) by Capillary Flow Porometry. A microporous polyolefin film is wet in a specific liquid (Galwick) having a known surface tension value, and then the amount of nitrogen gas which passes through pores under a specific pressure was measured while a pressure of the nitrogen gas is increased in a range of 0 to 400 psig. A pore diameter of the pore was assumed from the resulting measurement, through calculation by the following Equation 2.

$$P = 4\gamma \cos \theta / d \quad \text{[Equation 2]}$$

Wherein, p=pressure variation through pore
γ=surface tension of liquid
θ=contact angle of liquid
d=diameter of pore When the pore size and the pore distribution were obtained by Equation 2, a weighted average pore size was calculated from these values by the following equation 3.

$$\text{Weighted average pore size} = (\Sigma d_i^2 \times f_i)/(\Sigma d_i \times f_i) \quad \text{[Equation 2]}$$

Wherein, $d_i$=diameter of the (i)-th pore;
$f_i$=distribution rate of the (i)-th pore; and
for reference, $\Sigma f_i = 1$.

(6) Density of Inorganic Particle (a) An absolute specific weight on MSDS was used for an absolute density.

(b) A tap density was measured according to the standards of KS L 1621.

(7) Gas Permeability (Gurley Densmeter)

Gas permeability was measured using a pore measurement device (Gurley densometer: Toyoseiki Inc.). This is defined in terms of how long it takes for a predetermined volume (100 Ml) of gas to pass through a predetermined area (1 in²) of region at a predetermined pressure (about 1 to 2 psig), and a unit of the gas permeability is the second.

(8) Puncture Strength (N/μm)

Puncture strength was measured using UTM(Universal Test Machine) 3345 of INSTRON Inc, when the sample was pressed at a speed of 120 mm/min. Here, a pin tip having a diameter of 1.0mm and a radius of curvature of 0.5 mm was used for a pin.

$$\text{Puncture strength (N/μm)} = \text{measured Load(N)} \div \text{separator thickness (μm)} \quad \text{[Equation 4]}$$

(9) A tensile Strength was Measured Using ASTM D882.

(10) Shrinkage Ratio

Figure 1:
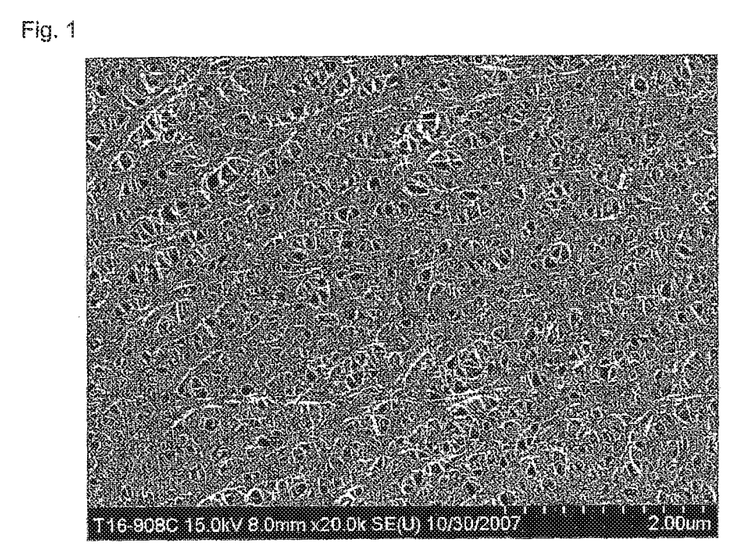
FIG. 1 is an electron micrograph (magnification of 20,000) of a surface of a microporous film before forming a coating layer.
Figure 2:
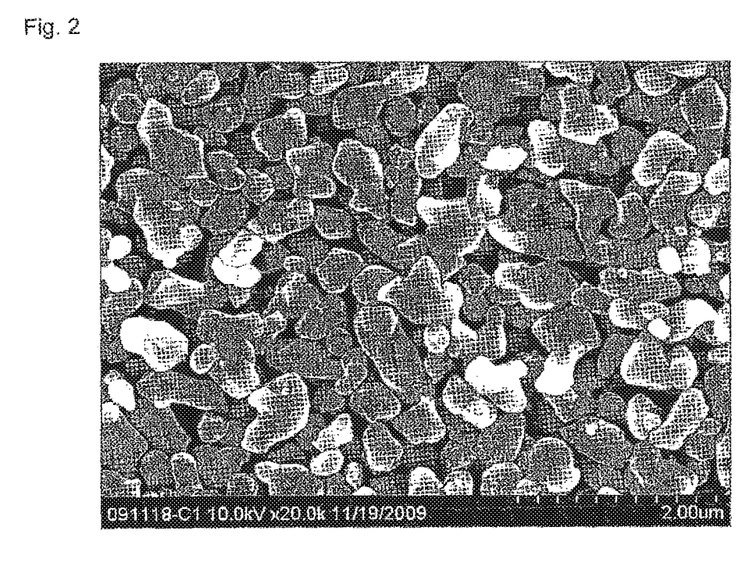
FIG. 2 is an electron micrograph (magnification of 20,000) of a surface of a microporous film after forming a coating layer.
Figure 3:
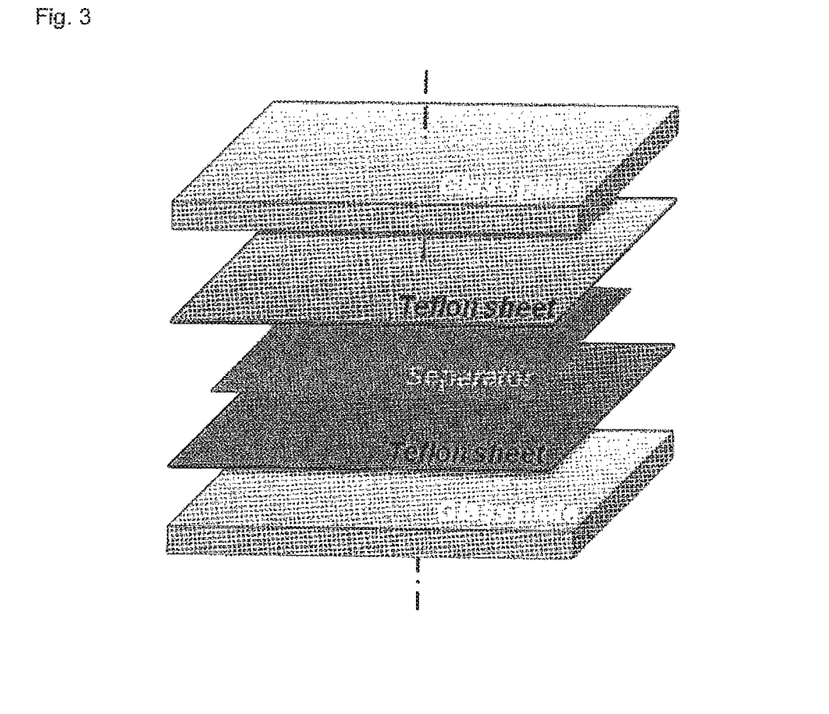
FIG. 3 shows a method for measuring an area shrinkage ratio at 170° C.

As shown in FIG. 3, a sample, in which a Teflon sheet was inserted between glass plates and a force of 7.5 mg/mm² was applied to a microporous composite film, was kept in an oven at 170° C. for 1 hour, followed by measurement of machine direction and transverse direction shrinkages, and then the final area shrinkage was calculated in percent.

(11) Tensile Modulus

A thermo-mechanical analysis (TMA) device of TA Inc. was used. A specimen of 5 mm×8 mm was used for a sample, and an initial load value of 0.01N was set to be continuously maintained by using a force ramp mode even at the time of temperature rise. A rate of temperature rise is 5° C./min, and stabilization was conducted for 30 seconds after the temperature reaches 130° C., which is a measurement temperature. As a load is increased from 0.1 to 0.4N at a rate of 0.1 N/min, strains for respective loads were measured. A tensile modulus is a value obtained by dividing the stress by the strain, and means the slope in a stress-strain curve. The tensile modulus is defined by stress variation over strain in a section from a distortion start point to a yield point.

(12) Shutdown Temperature

A shutdown temperature of a microporous composite film was measured in a simple cell of which impedance can be measured. The simple cell was assembled by positioning a microporous composite film between two graphite electrodes and injecting an electrolyte where 1M of lithium hexafluorophosphate (LiPF6) was dissolved in a solution of 1:1 ethylene carbonate and propylene carbonate. An electric resistance was measured with temperature rising from 25° C. to 200° C. at a rate of 5° C./min by using an alternating current of 1 KHz. Here, a temperature at which the electric resistance is rapidly increased to several hundreds to several thousands of ohms or more is determined as the shutdown temperature.

(13) Heat Distortion Temperature

A heat distortion temperature was measured by a method of ASTM D-648.

(14) Electrolyte Impregnation Rate

An electrolyte impregnation rate of a high thermostable polymer resin was measured by impregnating the high thermostable polymer resin with an electrolyte of 80° C., where 1M of lithium hexafluorophosphate (LiPF6) was dissolved in a solution of 1:1 ethylene carbonate and propylene carbonate, for 1 week, followed by washing with ethanol, drying at 80° C. for 3 hours in a vacuum oven, and weighing.

(15) Adhesive Strength

A black drawing paper (width: 2 cm) having a dynamic frictional coefficient of 0.15 was placed on a coated surface, and the drawing paper was drawn out while a weight of 200 g/cm² was applied thereto. At this time, a reference of an adhesive strength was established based on the amount by which the coated surface was smeared on the drawing paper or the coated surface was come off.

Grade A: inorganic matter is not smeared on the drawing paper.

Grade B: a small amount of inorganic matter is smeared on the drawing paper, and 10% or less of the coated surface comes off.

Grade C: 30% or less of the coated surface comes off.

Grade D: 50% or less of the coated surface comes off.

Grade F: 80% or more of the coated surface comes off.

Example 1

A microporous polyolefin film had a thickness of 20 μm, an average pore diameter of a surface layer of 35 nm, an gas permeability (Gurley) of 180 sec, and a punch strength of 0.22 N/μm.

In order to form a coating layer on one surface of the microporous polyolefin film (a base layer), a coating solution having a total solid content of 20% was prepared by dissolving 10 wt % of polyarylate (PAR) having a melting temperature of 201° C. and 90 wt % of $Al_2O_3$ powder (average particle diameter: 0.6 μm, porosity: 51%, surface area: 7.0 m²/g) were dissolved in 1,4-dioxane. One surface of the base layer was coated with the coating solution by using a bar coating method, and then dried by a predetermined volume of air under humidity of 50% in an oven of 50° C. to remove 1,4-dioxane. Finally, a coating layer with a thickness of 3.4 cm was formed on the base layer. In the resulting film, an adhesive strength was grade A, an area shrinkage rate at 170° C. for 1 hour was 1.2%, a porosity of the coated layer was 46%, a machine direction tensile modulus and a transverse direction tensile modulus at 130° C. were 5.2 MPa and 3.9 MPa, respectively, a gas permeability was 205 sec, $CCS_p$(permeability of microporous composite film)/$S_p$(permeability of microporous polyolefin film)=1.14, an average pore diameter measured after removal of surface was 32 nm, and $S_{ps}$(average pore diameter of microporous polyolefin film)/$CCS_{ps}$(average pore diameter of microporous composite film)=1.09.

Example 2

A microporous polyolefin film had a thickness of 9 μm, an average pore size of a surface layer of 39 nm, a gas permeability of 150 sec, and a punch strength of 0.35 N/μm.

In order to form a coating layer on both surfaces of the microporous polyolefin film (a base layer), a coating solution having a total solid content of 12% was prepared by dissolving 26 wt % of polyethersulfone (PES) having a melting temperature of 220° C. and 74 wt % of Al(OH)$_3$ powder (average particle diameter: 1.2 μm, porosity: 42%, surface area: 3.3 m$^2$/g) were dissolved in NMP. Both surfaces of the base layer were coated with the coating solution by using a dip coating method, and then dried by a predetermined volume of air under humidity of 50% in an oven of 50° C. to remove NMP. Finally, a coating layer with a thickness of 5.3 μm was formed on the base layer. In the resulting film, an adhesive strength was grade A, an area shrinkage rate at 170° C. for 1 hour was 9.5%, a porosity of the coated layer was 39%, a machine direction tensile modulus and a transverse direction tensile modulus at 130° C. were 1.8 MPa and 1.2 MPa, respectively, a gas permeability was 420 sec, and $CCS_p/S_p$=2.80. An average pore diameter measured after removal of surface was 30 nm, and $S_{ps}$(average pore diameter of microporous polyolefin film)/$CCS_{ps}$(average pore diameter of microporous composite film)=1.30.

Example 3

A microporous polyolefin film had a thickness of 28 μm, an average pore size of a surface layer of 43 nm, a gas permeability of 110 sec, and a punch strength of 0.16 N/μm.

In order to form a coating layer on one surface of the microporous polyolefin film (a base layer), a coating solution having a total solid content of 25% was prepared by dissolving 12 wt % of polycarbonate (PC) having a melting temperature of 230° C. and 88 wt % of Al$_2$O$_3$ powder (average particle diameter: 0.8 μm, porosity: 78%, surface area: 5.6 m$^2$/g) were dissolved in methylene chloride (MC). One surface of the base layer was coated with the coating solution by using a die coating method, and then dried by a predetermined volume of air under humidity of 50% in an oven of 50° C. to remove MC. Finally, a coating layer with a thickness of 6 μm was formed on the base layer. In the resulting film, an adhesive strength was grade A, an area shrinkage rate at 170° C. for 1 hour was 8.8%, a porosity of the coated layer was 58%, a machine direction tensile modulus and a transverse direction tensile modulus at 130° C. were 3.2 MPa and 2.4 MPa, respectively, a gas permeability was 210 sec, and $CCS_p/S_p$=1.91. An average pore diameter measured after removal of surface was 41 nm, and $S_{ps}$(average pore diameter of microporous polyolefin film)/$CCS_{ps}$(average pore diameter of microporous composite film)=1.05.

Example 4

A microporous polyolefin film had a thickness of 15 μm, an average pore size of a surface layer of 58 nm, a gas permeability of 56 sec, and a punch strength of 0.24 N/μm.

In order to form a coating layer on both surfaces of the microporous polyolefin film (a base layer), a coating solution having a total solid content of 28% was prepared by dissolving 6 wt % of polyarylate (PAR) having a melting temperature of 201° C. and 94 wt % of BaTiO$_3$ powder (average particle diameter: 0.45 μm, porosity: 58%, surface area: 4.2 m$^2$/g) were dissolved in Tetrahydrofuran (THF). Both surfaces of the base layer were coated with the coating solution by using a dip coating method, and then dried by a predetermined volume of air under humidity of 50% in an oven of 50° C. to remove THF. Finally, a coating layer with a thickness of 4 μm was formed on the base layer. In the resulting film, an adhesive strength was grade B, an area shrinkage rate at 170° C. for 1 hour was 3.2%, a porosity of the coated layer was 27%, a machine direction tensile modulus and a transverse direction tensile modulus at 130° C. were 6.2 MPa and 1.2 MPa, respectively, a gas permeability was 180 sec, and $CCS_p/S_p$=3.21. An average pore diameter measured after removal of surface was 50 nm, and $S_{ps}$(average pore diameter of microporous polyolefin film)/$CCS_{ps}$(average pore diameter of microporous composite film)=1.16.

Comparative Example 1

A microporous polyolefin film had a thickness of 25 μm, an average pore size of a surface layer of 48 nm, a gas permeability of 120 sec, and a punch strength of 0.19 N/μm.

The microporous polyolefin film having no coating layer formed thereon was used to obtain an area shrinkage rate at 170° C. for 1 hour was 85%, a machine direction tensile modulus and a transverse direction tensile modulus at 130° C. were 0.18 MPa and 0.07 MPa, respectively.

Comparative Example 2

A microporous polyolefin film had a thickness of 12 μm, an average pore size of a surface layer of 36 nm, a gas permeability of 230 sec, and a punch strength of 0.27 N/μm.

A coating solution was prepared by dissolving 15 wt % of polysulfone (PSf) having a melting temperature of 190° C. was dissolved in NMP. One surface of the microporous polyolefin film (a base layer) was coated with a coating solution, in which 15 wt % of polysulfone (PSf) having a melting temperature of 190° C. was dissolved in NMP, by using a microgravure coating method, and then dried to remove NMP, followed by impregnation with water. Finally, a coating layer with a thickness of 5 μm was formed on the base layer. In the resulting film, an adhesive strength was grade A, an area shrinkage rate at 170° C. for 1 hour was 78%, a porosity of the coated layer was 66%, a machine direction tensile modulus and a transverse direction tensile modulus at 130° C. were 0.36 MPa and 0.16 MPa, respectively, a gas permeability was 265 sec, and $CCS_p/S_p$=1.15. An average pore diameter measured after removal of surface was 35 nm, and $S_{ps}$(average pore diameter of microporous polyolefin film)/$CCS_{ps}$(average pore diameter of microporous composite film)=1.03.

Comparative Example 3

A microporous polyolefin film had a thickness of 14 μm, an average pore size of a surface layer of 23 nm, a gas permeability of 350 sec, and a punch strength of 0.18 N/μm.

In order to form a coating layer on one surface of the microporous polyolefin film (a base layer), a coating solution having a total solid content of 7% was prepared by dissolving 20 wt % of polyarylate (PAR) having a melting temperature of 201° C. and 80 wt % of CaCO$_3$ powder (average particle diameter: 0.08 μm, porosity: 38%, surface area: 20 m$^2$/g) were dissolved in tetrahydrofurane (THF). One surface of the base layer was coated with the coating solution by using a die coating method, and then dried by a predetermined volume of air under humidity of 50% in an oven of 50° C. to remove acetone. Finally, a coating layer with a thickness of 2.5 μm was formed on the base layer. In the resulting film, an adhesive strength was grade F, an area shrinkage rate at 170° C. for 1 hour was 63%, a porosity of the coated layer was 31%, a machine direction tensile modulus and a transverse direction tensile modulus at 130° C. were 0.15 MPa and 0.09 MPa, respectively, a gas permeability was 500 sec, and $CCS_p/S_p=1.43$. An average pore diameter measured after removal of surface was 16 nm, and $S_{ps}$(average pore diameter of microporous polyolefin film)/$CCS_{ps}$(average pore diameter of microporous composite film)=1.44.

Comparative Example 4

A microporous polyolefin film had a thickness of 33 μm, an average pore size of a surface layer of 44 nm, a gas permeability of 130 sec, and a punch strength of 0.11 N/μm.

In order to form a coating layer on one surface of the microporous polyolefin film (a base layer), a coating solution having a total solid content of 15% was prepared by dissolving 50 wt % of polyvinylidene fluoride-co-hexafluoropropylene (PVDF-HFP) having a melting temperature of 150° C. and 50 wt % of silicon resin powder (average particle diameter: 0.8 μm, porosity: 81%, surface area: 25 m²/g) were dissolved in chloroform (CHF). One surface of the base layer was coated with the coating solution by using a bar coating method, and then dried by a predetermined volume of air under humidity of 50% in an oven of 50° C. to remove chloroform. Finally, a coating layer with a thickness of 7 μm was formed on the base layer. In the resulting film, an adhesive strength was grade D, an area shrinkage rate at 170° C. for 1 hour was 75%, a porosity of the coated layer was 46%, a machine direction tensile modulus and a transverse direction tensile modulus at 130° C. were 0.29 MPa and 0.28 MPa, respectively, a gas permeability was 480 sec, and $CCS_p/S_p=3.69$. An average pore diameter measured after removal of surface was 40 nm, and $S_{ps}$(average pore diameter of microporous polyolefin film)/$CCS_{ps}$(average pore diameter of microporous composite film)=1.10.

Comparative Example 5

A microporous polyolefin film had a thickness of 7 μm, an average pore size of a surface layer of 35 nm, a gas permeability of 210 sec, and a punch strength of 0.42 N/μm.

In order to form a coating layer on one surface of the microporous polyolefin film (a base layer), a coating solution having a total solid content of 30% was prepared by dissolving 10 wt% of polyphenylsulfide (PPSU) having a melting temperature of 220° C. and 90 wt % of Al(OH)₃ powder (average particle diameter: 0.7 μm, porosity: 60%, surface area: 4.5 m²/g) were dissolved in dimethylaceteamide (DCB). Both surfaces of the base layer was coated with the coating solution by using a dip coating method, and then dried by a predetermined volume of air under humidity of 50% in an oven of 50° C. to remove dimethylaceteamide. Finally, a coating layer with a thickness of 11 μm was formed on the base layer. In the resulting film, an adhesive strength was grade C, an area shrinkage rate at 170° C. for 1 hour was 1.2%, a porosity of the coated layer was 23%, a machine direction tensile modulus and a transverse direction tensile modulus at 130° C. were 7.6 MPa and 5.2 MPa, respectively, a gas permeability was 1170 sec, and $CCS_p/S_p=5.57$. An average pore diameter measured after removal of surface was 20 nm, and $S_{ps}$(average pore diameter of microporous polyolefin film)/$CCS_{ps}$(average pore diameter of microporous composite film)=1.75.

Table 2 shows physical property measurement results of the microporous polyolefin films of the above examples and comparative examples.

TABLE 2

|  | Thickness of base layer (μm) | Average pore diameter of surface layer(nm) | Gas permeabilty (sec) | Puncture strength (N/μm) |
|---|---|---|---|---|
| Example 1 | 20 | 35 | 180 | 0.22 |
| Example 2 | 9 | 39 | 150 | 0.35 |
| Example 3 | 28 | 43 | 110 | 0.16 |
| Example 4 | 15 | 58 | 56 | 0.24 |
| Comparative example 1 | 25 | 48 | 120 | 0.19 |
| Comparative example 2 | 12 | 36 | 230 | 0.27 |
| Comparative example 3 | 14 | 23 | 350 | 0.18 |
| Comparative example 4 | 33 | 44 | 130 | 0.11 |
| Comparative example 5 | 7 | 35 | 210 | 0.42 |

Table 3 briefly shows coating methods of the examples and the comparative examples.

TABLE 3

|  | Polymer resin | Inorganic matter | Average diameter of inorganic particles (μm) | Porosity of inorganic particles (%) | Surface area of inorganic particles (m²/g) | Content ratio | Solvent | Solid Content (%) |
|---|---|---|---|---|---|---|---|---|
| Example 1 | PAR | Al₂O₃ | 0.6 | 51 | 7 | 10:90 | 1,4-Dioxane | 20 |
| Example 2 | PES | Al(OH)₃ | 1.2 | 42 | 3.3 | 26:74 | NMP | 12 |
| Example 3 | PC | Al₂O₃ | 0.8 | 78 | 5.6 | 12:88 | MC | 25 |
| Example 4 | PAR | BaTiO₃ | 0.45 | 58 | 4.2 | 6:94 | THF | 28 |
| Comparative example 1 | — | — | — | — | — | — | — | — |
| Comparative example 2 | PSf | — | — | — | — | — | NMP | 15 |
| Comparative example 3 | PAR | CaCO₃ | 0.08 | 38 | 20 | 20:80 | THF | 7 |
| Comparative example 4 | PVDF-HFP | Silicon | 0.8 | 81 | 25 | 50:50 | CHF | 15 |
| Comparative example 5 | PPSU | Al(OH)₃ | 0.7 | 60 | 4.5 | 10:90 | DCB | 30 |

Table 4 shows physical property measurement results of the microporous composite films of the above examples and comparative examples.

TABLE 4

|  | Thickness of coating layer | 170° C. Area shrinkage rate (%) | Porosity of coating layer(%) | Machine direction tensile modulus (MPa) | Transverse direction tensile modulus (MPa) | Gas Permeability (sec) | $CCS_p/S_p$ | Average Pore diameter (nm) | $S_{ps}/CCS_{ps}$ | Adhesive strength (grade) |
|---|---|---|---|---|---|---|---|---|---|---|
| Example 1 | 5 | 1.20 | 46 | 5.2 | 3.9 | 205 | 1.14 | 32 | 1.09 | A |
| Example 2 | 5.3 | 9.50 | 39 | 1.8 | 1.2 | 420 | 2.80 | 30 | 1.30 | A |
| Example 3 | 6 | 8.80 | 58 | 3.2 | 2.4 | 210 | 1.91 | 41 | 1.05 | A |
| Example 4 | 4 | 3.20 | 27 | 6.2 | 1.2 | 180 | 3.21 | 50 | 1.16 | B |
| Comparative example 1 | — | 85 | — | 0.18 | 0.07 | — | — | — | — | — |
| Comparative example 2 | 5 | 78 | 66 | 0.36 | 0.16 | 265 | 1.15 | 35 | 1.03 | A |
| Comparative example 3 | 2.5 | 63 | 31 | 0.15 | 0.09 | 500 | 1.43 | 16 | 1.44 | F |
| Comparative example 4 | 7 | 75 | 46 | 0.29 | 0.28 | 480 | 3.69 | 40 | 1.10 | F |
| Comparative example 5 | 11 | 1.2 | 23 | 7.6 | 5.2 | 1170 | 5.57 | 20 | 1.75 | C |

As shown in Table 4, each of the microporous composite films manufactured by the examples 1 to 4 has an area shrinkage (170° C., 1 hr) of 10% or less, a machine direction tensile modulus and a transverse direction tensile modulus of 0.5 MPa to 7.0 MPa, respectively, a permeability ratio between microporous composite film ($CCS_{ps}$) and microporous polyolefin film ($S_{ps}$) of 1.1≤CCSp/Sp≤3.5, and a permeability of the microporous composite film of 450 sec or less.

The microporous composite film according to the present invention can minimize the reduction in permeability of the microporous polyolefin film, achieve an excellent adhesive strength, and fundamentally solve the safety problem due to high power and high capacity of the battery. Moreover, according to the present invention, stable and reliable batteries can be manufactured with uniform thickness and excellent quality of the microporous composite film.

The invention claimed is:

1. A microporous composite film having a coating layer with a thickness of 3 to 8 μm and a porosity of 25 to 60% formed on at least one surface of a microporous polyolefin film, the coating layer simultaneously including a high thermostable polymer resin having a melting temperature or glass transition temperature of 170° C. to 500° C. and inorganic particles having a porosity of 40 to 80%, wherein the microporous composite film has the following properties:
   1) an area shrinkage (170° C., 1 hr) is 10% or less;
   2) a tensile modulus in each of a machine direction and a transverse direction at 130° C. is 0.5 MPa to 7.0 MPa;
   3) a ratio between permeability of the microporous composite film ($CCS_p$) and permeability of the microporous polyolefin film ($S_p$) is 1.1≤$CCS_p/S_p$≤3.5;
   4) a permeability of the microporous composite film is 450 sec or less; and
   5) a ratio between an average pore diameter of the microporous polyolefin film ($S_{ps1}$) before the formation of the coating layer and an average pore diameter of the microporous polyolefin film ($S_{ps2}$) measured after removing the coating layer from the microporous composite film is 1.01≤$S_{ps1}/S_{ps2}$≤1.5.

2. The microporous composite film of claim 1, wherein the high thermostable polymer resin for forming the coating layer has a thermal distortion temperature of 170° C. or higher and the high thermostable polymer has an electrolyte impregnation rate at 80° C. of 1 to 20%.

3. The microporous composite film of claim 1, wherein the inorganic particles for forming the coating layer have an average particle diameter of 0.3 to 1.5 μm and a surface area of 3 to 10 m²/g, and are selected from a group consisting of $Al_2O_3$, $SiO_2$, $BaTiO_3$, $Al(OH)_3$ and $TiO_2$.

4. The microporous composite film of claim 1, wherein the high thermostable polymer resin and the inorganic particles, for forming the coating layer, have a mass ratio of 30/70 to 5/95 and a solid content of 10 to 30%.

5. The microporous composite film of claim 1, wherein the microporous polyolefin film has a thickness of 8 to 30 μm, a puncture strength of 0.15 N/μm or more, and a gas permeability of 40 to 250 sec, an average pore diameter of the surface area of the microporous polyolefin film is 25 to 75 nm.

* * * * *

UNITED STATES PATENT AND TRADEMARK OFFICE
CERTIFICATE OF CORRECTION

PATENT NO. : 9,564,624 B2  
APPLICATION NO. : 13/702866  
DATED : February 7, 2017  
INVENTOR(S) : Yong Kyoung Kim et al.

Page 1 of 1

It is certified that error appears in the above-identified patent and that said Letters Patent is hereby corrected as shown below:

In the Claims

Column 24, Line 44, Claim 3, delete "$Al_2O_2$," and insert -- $Al_2O_3$, --

Signed and Sealed this  
Ninth Day of May, 2017

Michelle K. Lee  
*Director of the United States Patent and Trademark Office*